United States Patent [19]

Vanvoren et al.

[11] Patent Number: 5,069,842

[45] Date of Patent: Dec. 3, 1991

[54] PROCESS OF SHAPING CARBONACEOUS BLOCKS BY MULTIAXIAL COMPACTING

[75] Inventors: Claude Vanvoren; Benoit Coste, both of St. Jean de Maurienne; Francois Keime, Meylan, all of France

[73] Assignee: Aluminum Pechiney, Paris, France

[21] Appl. No.: 601,360

[22] Filed: Oct. 23, 1990

Related U.S. Application Data

[60] Division of Ser. No. 501,299, Mar. 30, 1990, Pat. No. 4,990,081, which is a continuation of Ser. No. 303,052, Jan. 27, 1989, abandoned, which is a continuation of Ser. No. 99,781, Sep. 22, 1987, abandoned.

[30] Foreign Application Priority Data

Sep. 30, 1986 [FR] France ................................ 86 13779

[51] Int. Cl.$^5$ .............................................. B28B 3/00
[52] U.S. Cl. .................................. 264/101; 264/105; 264/120
[58] Field of Search .............. 264/101, 102, 104, 105, 264/120, 122

[56] References Cited

U.S. PATENT DOCUMENTS

| | | | |
|---|---|---|---|
| 2,359,674 | 10/1944 | Pollock | 425/420 |
| 3,389,200 | 6/1968 | Olstowski et al. | 264/105 |
| 3,784,343 | 1/1974 | Iwasaki | 425/352 |
| 4,559,195 | 12/1985 | Heggenstaller | 264/120 |
| 4,826,419 | 5/1989 | Coste et al. | 264/120 X |

Primary Examiner—Leo B. Tentoni
Attorney, Agent, or Firm—Dennison, Meserole, Pollack & Scheiner

[57] ABSTRACT

The invention concerns a process for shaping, by compacting, carbonaceous blocks formed by a carbonaceous paste based on a carbonaceous aggregate such as coke, anthracite or graphite, and an organic cokable binder such as tar and optional additives. The carbonaceous paste is introduced into a mould in which some of the walls are displaceable with respect to their initial position and there are successively applied to said paste at least one stress $\sigma_n$ along an axis $A_n$, then at least one stress $\sigma_{n+1}$ along an axis $A_{n+1}$ which is not coincident with the axis $A_n$, then at least one stress $\sigma_{n+2}$ along an axis $A_{n+2}$ which is not coincident with the axis $A_{n+1}$, and so forth, repetitively, each stress $\sigma_{(i)}$ being applied after at least partial suppression of the stress $\sigma_{(i-1)}$. Use of the process substantially enhances compactness of the carbonaceous blocks.

10 Claims, 2 Drawing Sheets

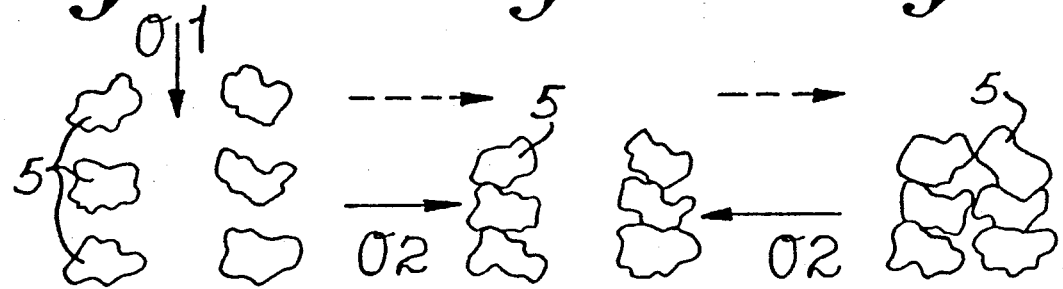
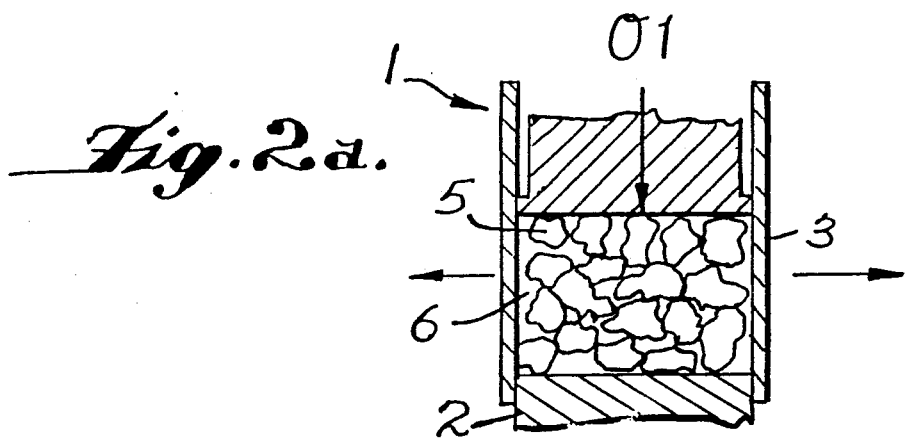
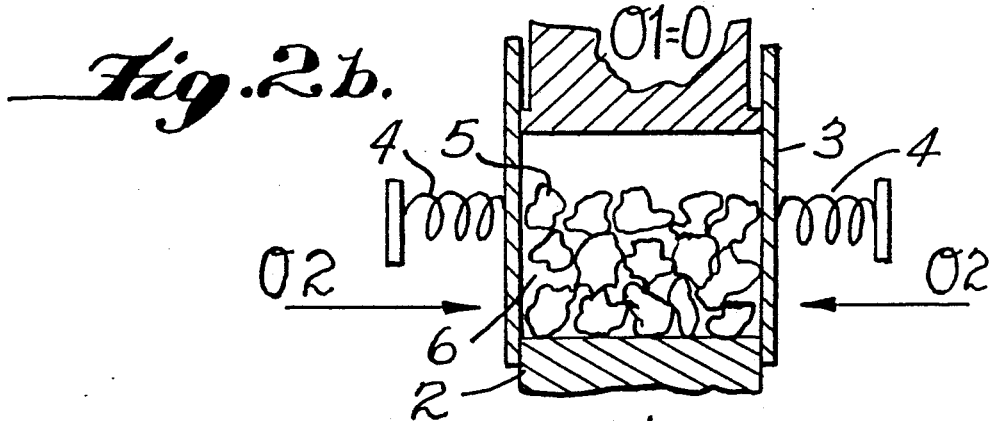
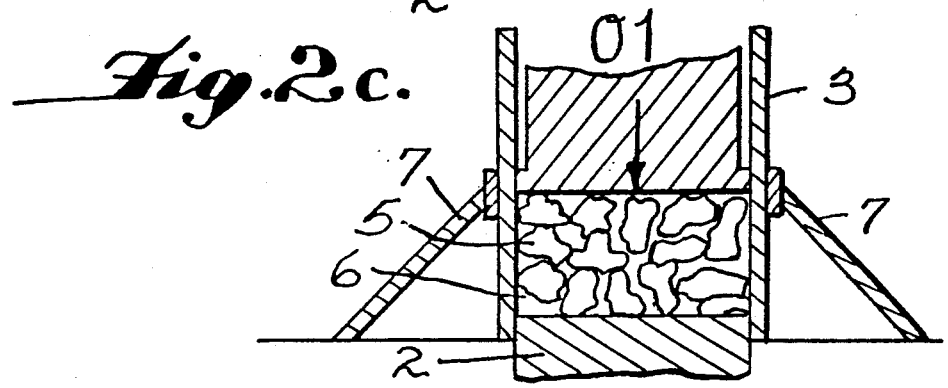

PROCESS OF SHAPING CARBONACEOUS BLOCKS BY MULTIAXIAL COMPACTING

This is a divisional of co-pending application Ser. No. 501,299 filed on 3/30/90, now U.S. Pat. No. 4,990,081, which is a file wrapper continuation of Ser. No. 303,052 filed on 1/27/89, now abandoned, which is a file wrapper continuation of Ser. No. 99,781 filed on 9/22/87, now abandoned.

BACKGROUND OF THE INVENTION

The present invention concerns a process and an apparatus for shaping by multiaxial compacting carbonaceous blocks and more particularly but not exclusively anodes intended for the production of aluminium by electrolysis using the Hall-Héroult process.

DESCRIPTION OF RELATED ART

At the present time, carbonaceous blocks such as the anodes which are used for the production of aluminium are produced by ramming, pressing, vibro-tamping or vibro-pressing of a carbonaceous paste formed by a crushed coke (and/or anthracite) aggregate and pitch or tar.

Those four procedures are based on the same principle: the carbonaceous paste is introduced at a temperature of the order of 120° to 140° C. into a non-deformable mold (referred to as 'oedometric') and a stress or a succession of substantially vertical stresses is or are applied thereto.

The application of the stress, referred to as 'loading', may be a single operation, which is the case with the pressing process in general, or a multiple operation, with two or three successive pressing operations in certain cases, and up to several hundreds of times in the case of vibro-tamping.

The levels of force used in different situations are substantially different: for example 28 MPa for a press with a single cycle, 2×18 MPa for a press with a double cycle, and 0.5 to 2.5 MPa in the case of a vibro-tamper. However, in every case, the level of compacting is limited either by the tar content, upon reaching a condition of saturation with tar of the intergranular space in the coke aggregate, or, in the case of a tar content which is less than the condition of saturation, the level of compacting is limited by virtue of the fact that the grains of coke come into contact with each other and cannot be brought any closer together. Therefore, in regard to uniaxial compacting, that is to say with a force applied in a single direction, there is a physical limit which prevents the apparent density of the compacted material from going beyond a certain value.

SUMMARY OF THE INVENTION

The invention concerns a process and an apparatus for multi-axial compacting, which comprises successively applying stresses in different directions to the material to be compacted so as to cause progressive arrangement phenomena in respect of the grains of aggregate, the result of which is to ensure maximum filling of the space permitted by the shape of the grains forming the aggregate, and the binder content.

More precisely, a first aspect of the invention is a process for shaping by multiaxial compacting of carbonaceous blocks formed by a carbonaceous paste based on a carbonaceous aggregate such as coke, anthracite or graphite, an organic cokable binder such as tar and optional additives characterised in that the carbonaceous paste is introduced into a mold in which some of the walls are displaceable reversibly with respect to their initial position and that there are successively applied to said paste at least one stress $\sigma_n$ along an axis $A_n$, then at least one stress $\sigma_{n+1}$ along an axis $A_{n+1}$ which is not coincident with the axis $A_n$, then at least one stress $\sigma_{n+2}$ along an axis $A_{n+2}$ which is not coincident with the axis $A_{n+1}$ and so forth, repetitively, each stress $\sigma_{(i)}$ being applied after at least partial suppression of the stress $\sigma_{(i-1)}$.

In accordance with a first particular embodiment of the invention the stresses are applied along two axes $A_n$ and $A_{n+1}$ which are perpendicular to each other.

In accordance with a second particular embodiment of the invention the axes $A_n$, $A_{n+1}$ and $A_{n+2}$ form a trirectangular trihedron.

Another aspect of the invention is an apparatus for carrying out the multiaxial compacting process. The apparatus comprises a mold in which certain walls are displaceable with respect to their initial position, such displacement preferably being effected parallel to the plane containing the wall, and in a direction perpendicular to the direction in which the stress is applied.

BRIEF DESCRIPTION OF THE DRAWINGS

FIGS. 1 to 3 illustrate the manner of carrying the invention into effect, in diagrammatic form.

FIG. 1 (FIGS. 1A-1C) is a diagrammatic view of the movement with which grains of aggregate dispersed in a binder are moved towards each other under the effect of a first stress or force $\sigma_1$ (which for example is vertical) and then a second stress $\sigma_2$, which is for example horizontal (perpendicular to $\sigma_1$).

FIG. 2 (FIGS. 2A-2C) is a diagrammatic view of biaxial compacting in accordance with the invention.

For greater ease of comprehension, the grains of coke are shown as being of greatly exaggerated size.

Figure 3A:
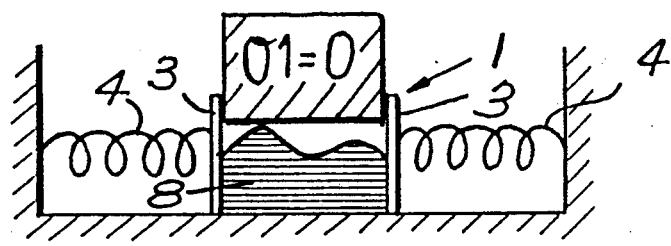
Figure 3B:
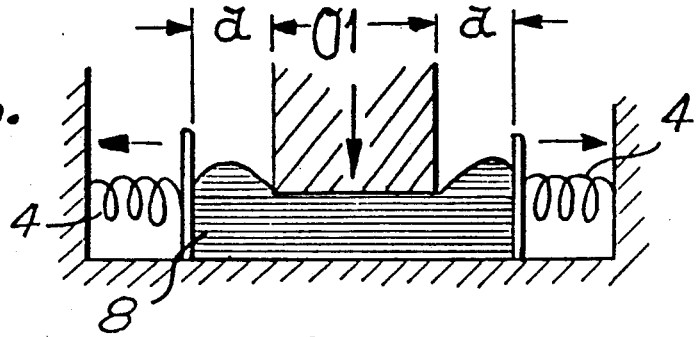
Figure 3C:
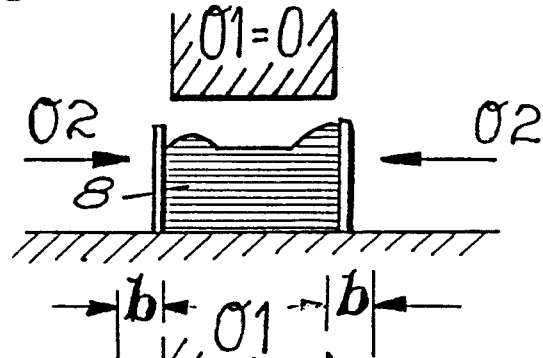
Figure 3D:
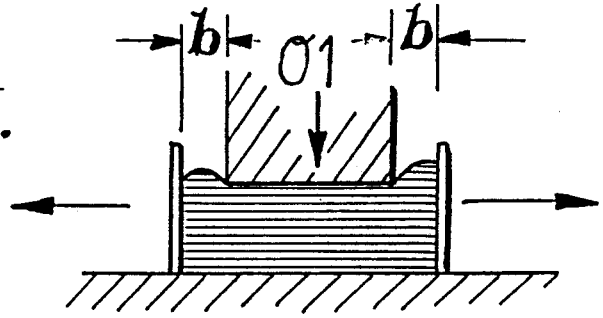
Figure 3E:
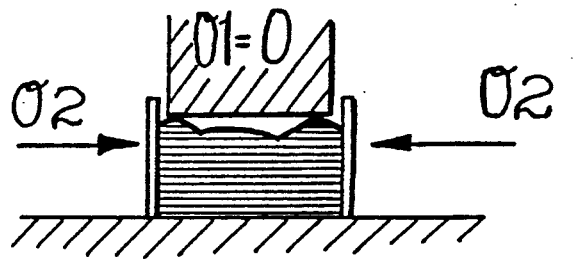
Figure 3F:
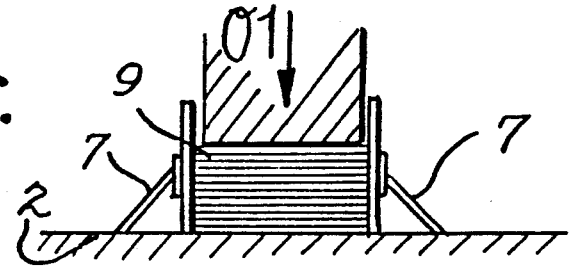

FIG. 3 (FIGS. 3A-3F) is a diagrammatic view of the phases of biaxial compacting of variable amplitude, in accordance with the invention. The amplitude of the displacement of the side walls has also been exaggerated for the sake of clarity of the drawings.

DESCRIPTION OF THE PREFERRED EMBODIMENTS

According to the invention, the block to be compacted is disposed in the mold of a press, for example a parallelepipedic mold 1 comprising a fixed bottom 2, two rigid, fixed, oppositely disposed side walls (not visible in the sectional view in FIG. 2) and the other two side walls 3 which are movable with respect to the block to be compacted under the effect of jacks or springs 4. During the loading operation, those resilient means 4 control and limit the movement of the movable walls away from each other and, after relief of the first stress or force $\sigma_1$, they apply a reaction stress which tends to return the walls to their original position. The same means 4 therefore also apply stresses $\sigma_2$ when the stress $\sigma_1$ is reduced or suppressed.

Rearrangement of the grains of coke 5 which are encased with binder 6 is illustrated in diagrammatic form in FIGS. 2A, 2B and 2C.

In a first embodiment, compacting is biaxial and comprises a succession of first stresses $\sigma_1$ and then second stresses $\sigma_2$ on two oppositely disposed walls 3 of the mold 1. The first stress $\sigma_1$ may be for example vertical but there is nothing to prevent the piston of the press from being disposed horizontally.

In a second embodiment, compacting is triaxial and comprises for example a succession of vertical stresses and then lateral stresses on two oppositely disposed walls, then a lateral stress on the other two walls, then again vertical or, as an alternative mode of operation, vertical and lateral on two oppositely disposed walls, vertical and lateral on the other two walls, again vertical, and so on. In this case also the piston of the press may be displaced in a direction other than vertical without thereby departing from the scope of the invention; in particular it may be disposed horizontally.

In practice, the nature of the material pressed and the complexity of the industrial equipment which is capable of performing the above-indicated sequences will be the criteria for choosing between one or other of those embodiments.

In addition, it is preferable for the amplitude of the movements of the side walls to be modulated in the course of the successive cycles. At the beginning, the degree of compacting of the carbonaceous paste introduced into the mold is low: it is therefore possible to control the downward movement of the piston and the displacement of the side walls, as being of a relatively large amplitude (a) in order to provide for effective working and shaping of the blank 8 of carbonaceous paste (see FIGS. 3A and 3B). That amplitude is then progressively reduced as indicated at (b) (see FIGS. 3C, and 3D). For at least the last cycle, the side walls must be completely blocked by a removable means as diagrammatically represented by the element 7 in FIGS. 3E and 3F, so as to impart the precise definitive dimensions as indicated at 9 to the carbonaceous block.

The mold for carrying out the compacting process may be made in accordance with various alternative forms which do not go outside the scope of the invention. For example the mold may not be parallelepipedic but may be formed by a bottom and two or more sectors, in the case of shaping cylindrical electrodes. In the particular case of two semi-cylinders, the stress or force $\sigma_1$ is applied by the piston of a press, while the two semi-cylinders then form the two movable walls which move away from each other during the application of the force $\sigma_1$ and which move towards each other under the effect of springs or jacks to apply the stress or force $\sigma_2$, after partial or total suppression of $\sigma_1$.

Likewise, the bottom of the mold may be fixed or movable: in the latter case it may be formed by the second piston of a press, while the lines of movement of the pistons may be both vertical and horizontal.

Finally, when there is a wish to achieve a higher level of compactness, it is possible to carry out that operation under a pressure lower than atmospheric pressure so that in each initial working or shaping operation, the occluded gases and air are rapidly removed.

Having regard to the usual temperature involved in pressing carbonaceous pastes (120° to 140° C.) and the vapor pressure of the volatile components of the tar, the depression will be selected to be such as not to cause substantial distillation of those components: for example 100 torrs (about 13300 Pa) (that value is given by way of indication).

EXAMPLE OF PERFORMANCE OF THE INVENTION

The invention was carried into effect in 'biaxial' mode in an expandable oedometric mold formed by a fixed bottom, two fixed oppositely disposed side walls with the other two side walls being controlled by a resilient system (formed by springs) of known predetermined stiffness.

The mold having received a charge of conventional carbonaceous paste (coke+tar) at 150° C., there is applied thereto by a cyclic process a series of n vertical stresses up to a level $\sigma_1$ (loading), followed by a removal of load down to zero. In the loading operation, the two walls move away from each other under the effect of the lateral stress (opposite in direction to the stress opposed by the springs), being proportional to $\sigma_1$. In the operation of relieving the load, under the action of the lateral springs, the two side walls tend to move towards each other and thus apply the transverse stress $\sigma_2$.

In practice, in accordance with the invention, series of 100 cycles were carried out, using a stress $\sigma_1$ of 12 MPa, with the stress $\sigma_2$ being of the order of 8 MPa.

In parallel therewith, the same carbonaceous paste was compacted at the same temperature in an oedometric mold, in accordance with the prior art:
on the one hand, using pressing involving a single cycle under a force of 45 MPa, and
on the other hand, using multi-cycle pressing with 100 cycles under a force of 12 MPa.

It was found that the blocks produced in accordance with the invention were of the following dry density values:
higher than 0.08 g/cm³ in the blocks obtained under 45 MPa/1 cycle,
higher than 0.06 g/cm³ in the blocks obtained under 12 MPa/100 cycles.

Dry density (DD) is defined by the following relationship:

$$DD = AD \,(100 - \% \text{ tar})/100$$

AD being the apparent density of the crude carbonaceous paste in the state in which it is measured, and % tar being the amount of tar as a percentage by weight in the crude paste.

The gain is very significant and corresponds to a substantial improvement in the quality of the anodes.

ADVANTAGES ACHIEVED BY THE INVENTION

Multiaxial compacting makes it possible to operate with lower stresses or forces (with the same quality of anode) than when using conventional processes, which makes it possible to produce anodes of larger dimensions with a given press, by simply changing the mold. Multiaxial compacting makes it possible to reduce the anisotropy of the pressed anodes. In particular it is found that the resistivity of the anodes when fired, which is usually greater in the direction of pressing than that which is measured in a direction perpendicular to the direction of pressing, tends to be equalized out in the two directions.

Finally, multiaxial compacting increases the compactness of the anode and therefore its operating life on the electrolysis tank, which reduces the frequency with which anode changing operations have to be carried out, it being known that such operations have a disturbing influence on the thermal equilibrium of the tank.

We claim:

1. A process for shaping, by compacting, carbonaceous blocks formed by a carbonaceous paste comprising a carbonaceous aggregate selected from the group consisting of coke, anthracite, and graphite, an organic cokable binder comprising tar and optional additives, comprising the steps of introducing the carbonaceous paste into a mold having walls, at least one of said walls being displaceable with respect to its initial position and successively applying to said paste at least one stress $\sigma_n$ along an axis $A_n$, then at least one stress $\sigma_{n+1}$ along an axis $A_{n+1}$ which is not coincident with the axis $A_n$, then at least one stress $\sigma_{n+2}$ along an axis $A_{n+2}$ which is not coincident with the axis $A_{n+1}$, said stresses being applied repetitively, each stress $\sigma_{(i)}$ being applied after at least partial suppression of the preceding stress $\sigma_{(i-1)}$.

2. A process according to claim 1 wherein the axes $A_n$ and $A_{n+1}$ are perpendicular to each other.

3. A process according to claim 1 wherein the axes $A_n$, $A_{n+1}$ and $A_{n+2}$ form a trirectangular trihedron.

4. A process according to claim 1 wherein said stresses are applied by displacing the walls successively in a direction substantially perpendicular to the axes of the stresses.

5. A process according to claim 4 wherein the amplitude of each successive displacement of the walls is progressively reduced as the compacting process progresses.

6. A process according to claim 1 wherein at least a part of the stresses is applied by the piston of a press.

7. A process according to claim 1 wherein at least a part of the stresses is applied by resilient reaction of walls of the mold.

8. A process according to claim 1 wherein the pressure within the mold is reduced to a pressure lower than atmospheric pressure.

9. A process according to claim 2 wherein said stresses are applied by displacing the walls successively in a direction substantially perpendicular to the axes of the stresses.

10. A process according to claim 3 wherein said stresses are applied by displacing the walls successively in a direction substantially perpendicular to the axes of the stresses.

* * * * *